(12) United States Patent
Lajewardi

(10) Patent No.: US 10,982,703 B2
(45) Date of Patent: Apr. 20, 2021

(54) SCREW-TYPE FASTENER FOR CONCRETE AND HURRICANE RESISTANCE APPLICATIONS

(71) Applicant: THE HILLMAN GROUP, INC., Cincinnati, OH (US)

(72) Inventor: Farhad Lajewardi, Toronto (CA)

(73) Assignee: THE HILLMAN GROUP, INC., Cincinnati, OH (US)

( * ) Notice: Subject to any disclaimer, the term of this patent is extended or adjusted under 35 U.S.C. 154(b) by 246 days.

(21) Appl. No.: 16/364,236

(22) Filed: Mar. 26, 2019

(65) Prior Publication Data

US 2019/0309784 A1  Oct. 10, 2019

Related U.S. Application Data

(60) Provisional application No. 62/654,770, filed on Apr. 9, 2018.

(51) Int. Cl.
*F16B 25/00* (2006.01)

(52) U.S. Cl.
CPC ...... *F16B 25/0068* (2013.01); *F16B 25/0026* (2013.01); *F16B 25/0052* (2013.01); *F16B 25/00* (2013.01)

(58) Field of Classification Search
CPC .... F16B 23/003; F16B 25/00; F16B 25/0026; F16B 25/0052; F16B 25/0057; F16B 25/0068; F16B 25/0084; Y10S 411/919
USPC ... 411/387.4, 387.8, 403, 411–412, 424, 426
See application file for complete search history.

(56) References Cited

U.S. PATENT DOCUMENTS

| 1,151,861 | A |   | 8/1915 | Brumback |
| 3,136,205 | A |   | 6/1964 | Ansingh |
| 3,207,023 | A | * | 9/1965 | Knohl ................. F16B 25/0031 411/387.3 |
| 3,246,556 | A |   | 4/1966 | Phipard, Jr. |
| RE28,111 | E | * | 8/1974 | Laverty ............... F16B 25/0057 411/412 |
| 3,903,784 | A |   | 9/1975 | Dekker |
| 3,937,119 | A |   | 2/1976 | Ernst |

(Continued)

FOREIGN PATENT DOCUMENTS

DE          9216791         4/1994

OTHER PUBLICATIONS

PCT, International Search Report and Written Opinion of the International Searching Authority of PCT/US2019/23812, dated Jun. 14, 2019, 10 pages.

*Primary Examiner* — Roberta S Delisle
(74) *Attorney, Agent, or Firm* — Thompson Hine LLP

(57) ABSTRACT

A screw for use concrete and hurricane applications includes a head end, a shank and a tapered end. A high thread begins on the tapered end, extends onto the shank and terminates at a first axial location along the shank, wherein the high thread defines a high peripheral edge, and at least a first helical portion of the high peripheral edge includes a plurality of notches and the first helical portion extends from on or proximate to the tapered end and substantially to the first axial location. A low thread begins on the tapered end, extends onto the shank and terminates substantially at the first axial location such that an axial length of the low thread is substantially the same as and contiguous with an axial length of the high thread. The low thread defines a low peripheral edge that is free of any notches.

19 Claims, 17 Drawing Sheets

(56) References Cited

U.S. PATENT DOCUMENTS

| | | | |
|---|---|---|---|
| 4,323,326 A | 4/1982 | Okada et al. | |
| 4,655,661 A * | 4/1987 | Brandt | F16B 25/0031 411/387.1 |
| 4,697,969 A | 10/1987 | Sparkes | |
| 4,842,467 A | 6/1989 | Armstrong | |
| 5,061,136 A * | 10/1991 | Dixon | F16B 25/0047 411/412 |
| 5,249,882 A | 10/1993 | Nagoshi et al. | |
| 5,294,227 A * | 3/1994 | Forster | F16B 25/0026 411/386 |
| 5,516,248 A | 5/1996 | DeHaitre | |
| 5,683,217 A | 11/1997 | Walther et al. | |
| 5,722,376 A | 3/1998 | Sweeten | |
| 5,827,030 A | 10/1998 | Dicke | |
| 5,897,280 A * | 4/1999 | Dicke | F16B 25/0015 411/411 |
| 5,957,646 A | 9/1999 | Giannuzzi | |
| 6,015,252 A | 1/2000 | Peck | |
| 6,106,208 A | 8/2000 | Lin | |
| 6,152,666 A | 11/2000 | Walther et al. | |
| 6,250,866 B1 | 6/2001 | Devine | |
| 6,332,741 B1 | 12/2001 | Janusz | |
| 6,394,725 B1 | 5/2002 | Dicke | |
| 6,402,448 B1 | 6/2002 | Dicke | |
| 6,428,259 B1 | 8/2002 | Yu | |
| 6,616,391 B1 | 9/2003 | Druschel | |
| 6,666,638 B2 | 12/2003 | Craven | |
| 6,698,987 B1 | 3/2004 | Dicke | |
| 6,699,421 B2 | 3/2004 | Shimizu et al. | |
| 6,722,830 B2 * | 4/2004 | Forster | F16B 35/06 411/188 |
| 6,789,989 B2 | 9/2004 | Walther | |
| 6,789,991 B2 | 9/2004 | Hsu | |
| 6,926,484 B2 | 8/2005 | Kram et al. | |
| 6,941,635 B2 | 9/2005 | Craven | |
| 6,966,737 B2 | 11/2005 | McGovern et al. | |
| 7,037,059 B2 | 5/2006 | Dicke | |
| 7,070,376 B1 | 7/2006 | Toback | |
| 7,101,133 B2 | 9/2006 | Dicke | |
| 7,118,317 B2 | 10/2006 | Hofschneider | |
| 7,255,523 B2 | 8/2007 | Laan | |
| 7,293,947 B2 | 11/2007 | Craven | |
| 7,334,976 B2 | 2/2008 | Dicke | |
| 7,399,150 B2 | 7/2008 | Hofschneider | |
| 7,604,445 B1 | 10/2009 | Dicke | |
| 7,677,854 B2 | 3/2010 | Langewiesche | |
| 7,682,119 B2 | 3/2010 | Chen | |
| 7,682,182 B2 | 3/2010 | Kondo et al. | |
| 7,695,228 B2 | 4/2010 | Craven | |
| 7,699,569 B2 | 4/2010 | Su | |
| 7,785,055 B2 | 8/2010 | Dicke | |
| 7,862,279 B2 | 1/2011 | Stiebitz et al. | |
| 7,862,280 B2 | 1/2011 | Su | |
| 7,988,396 B2 | 8/2011 | Weiss et al. | |
| 8,104,248 B2 | 1/2012 | Gillis et al. | |
| 8,137,042 B2 | 3/2012 | Severns | |
| 8,348,571 B2 | 1/2013 | Shih | |
| 8,348,575 B2 | 1/2013 | Walther | |
| 8,360,702 B2 | 1/2013 | Yu | |
| 8,382,414 B2 | 2/2013 | Vandenberg | |
| 8,408,855 B2 | 4/2013 | Stiebitz et al. | |
| 8,430,618 B2 | 4/2013 | Baer | |
| 8,430,619 B2 * | 4/2013 | Olsen | F16B 25/00 411/412 |
| 8,480,342 B2 | 7/2013 | Stiebitz et al. | |
| 8,511,957 B2 * | 8/2013 | Gonciarz | F16B 25/0026 411/386 |
| 8,511,958 B2 | 8/2013 | Chang | |
| 8,591,159 B2 | 11/2013 | Walther | |
| 8,740,531 B2 | 6/2014 | Su et al. | |
| 8,858,145 B2 | 10/2014 | Su et al. | |
| 8,864,430 B2 | 10/2014 | Su | |
| 8,864,431 B2 | 10/2014 | Su et al. | |
| 8,944,734 B2 * | 2/2015 | Su | F16B 25/0068 411/386 |
| 9,145,911 B2 | 9/2015 | Shih | |
| 9,163,654 B2 | 10/2015 | Barenski, Jr. et al. | |
| 2001/0038781 A1 | 11/2001 | Mallet et al. | |
| 2007/0036632 A1 | 2/2007 | Lin | |
| 2007/0269287 A1 | 11/2007 | Runge et al. | |
| 2008/0031705 A1 | 2/2008 | Severns | |
| 2009/0110515 A1 | 4/2009 | Chen | |
| 2010/0158634 A1 | 6/2010 | Walther | |
| 2011/0014007 A1 * | 1/2011 | Gaudron | F16B 25/0026 411/412 |
| 2011/0064540 A1 | 3/2011 | Walther | |
| 2011/0176888 A1 * | 7/2011 | Gaudron | F16B 25/0068 411/394 |
| 2011/0188966 A1 | 8/2011 | Tsai | |
| 2012/0186067 A1 | 7/2012 | Walther | |
| 2012/0207564 A1 | 8/2012 | Kochheiser | |
| 2013/0039720 A1 | 2/2013 | Shih | |
| 2014/0064878 A1 | 3/2014 | Su et al. | |
| 2014/0178150 A1 | 6/2014 | Su et al. | |
| 2015/0184685 A1 | 7/2015 | Su et al. | |
| 2016/0032956 A1 * | 2/2016 | Wu | F16B 25/0068 411/387.8 |

* cited by examiner

SCREW-TYPE FASTENER FOR CONCRETE AND HURRICANE RESISTANCE APPLICATIONS

TECHNICAL FIELD

This application relates generally to threaded fasteners for concrete applications and hurricane resistance, and more particularly, to a multi-thread screw for such purposes.

BACKGROUND

A typical screw configuration includes an elongated shank that extends between a driving head of the screw and a pointed end of the screw. At least part of the shank is helically threaded. Concrete screws with a variety of configurations are known. However, improvements are continuously sought.

It would be desirable to provide a screw configuration that facilitates quick and effective installation with relatively low torque requirement and a resulting high resistance to pull-out after installation, particularly for concrete applications and resistance to hurricane forces.

SUMMARY

In one aspect, a screw for use concrete and hurricane applications includes a head end, a shank and a tapered end, the head end including a tool engaging part, the head end located at one end of the shank and the tapered end located at an opposite end of the shank. A high thread is formed along the shank. The high thread begins on the tapered end, extends onto the shank and terminates at a first axial location along the shank, wherein the high thread defines a high peripheral edge, and at least a first helical portion of the high peripheral edge includes a plurality of notches and the first helical portion extends from on or proximate to the tapered end and substantially to the first axial location. The high thread includes a leading flank and a trailing flank that meet at the high peripheral edge and together define a high thread angle that is between about thirty degrees and about forty-five degrees. A low thread is formed along the shank, where the low thread begins on the tapered end, extends onto the shank and terminates substantially at the first axial location such that an axial length of the low thread is substantially the same as and contiguous with an axial length of the high thread. The low thread defines a low peripheral edge that is free of any notches. The low thread includes a leading flank and a trailing flank that meet at the low peripheral edge and together define a low thread angle that is between about thirty degrees and about forty-five degrees.

In another aspect, a screw for use in concrete applications and hurricane applications includes a head end, a shank and a tapered end, the head end including a tool engaging part, the head end located at one end of the shank and the tapered end located at an opposite end of the shank. A high thread is formed along the shank, wherein the high thread begins on the tapered end, extends onto the shank and terminates at a first axial location along the shank, wherein the high thread defines a high peripheral edge, and at least a first helical portion of the high peripheral edge includes a plurality of notches, wherein the first helical portion extends from on or proximate to the tapered end and substantially to the first axial location. A low thread is formed along the shank, wherein the low thread begins on the tapered end, extends onto the shank and terminates substantially at the first axial location along the shank such that an axial length of the low thread is substantially the same as and contiguous with an axial length of the high thread, wherein the low thread defines a low peripheral edge that is free of any notches.

The details of one or more embodiments are set forth in the accompanying drawings and the description below. Other features, objects, and advantages will be apparent from the description and drawings, and from the claims.

DETAILED DESCRIPTION

Figure 1:
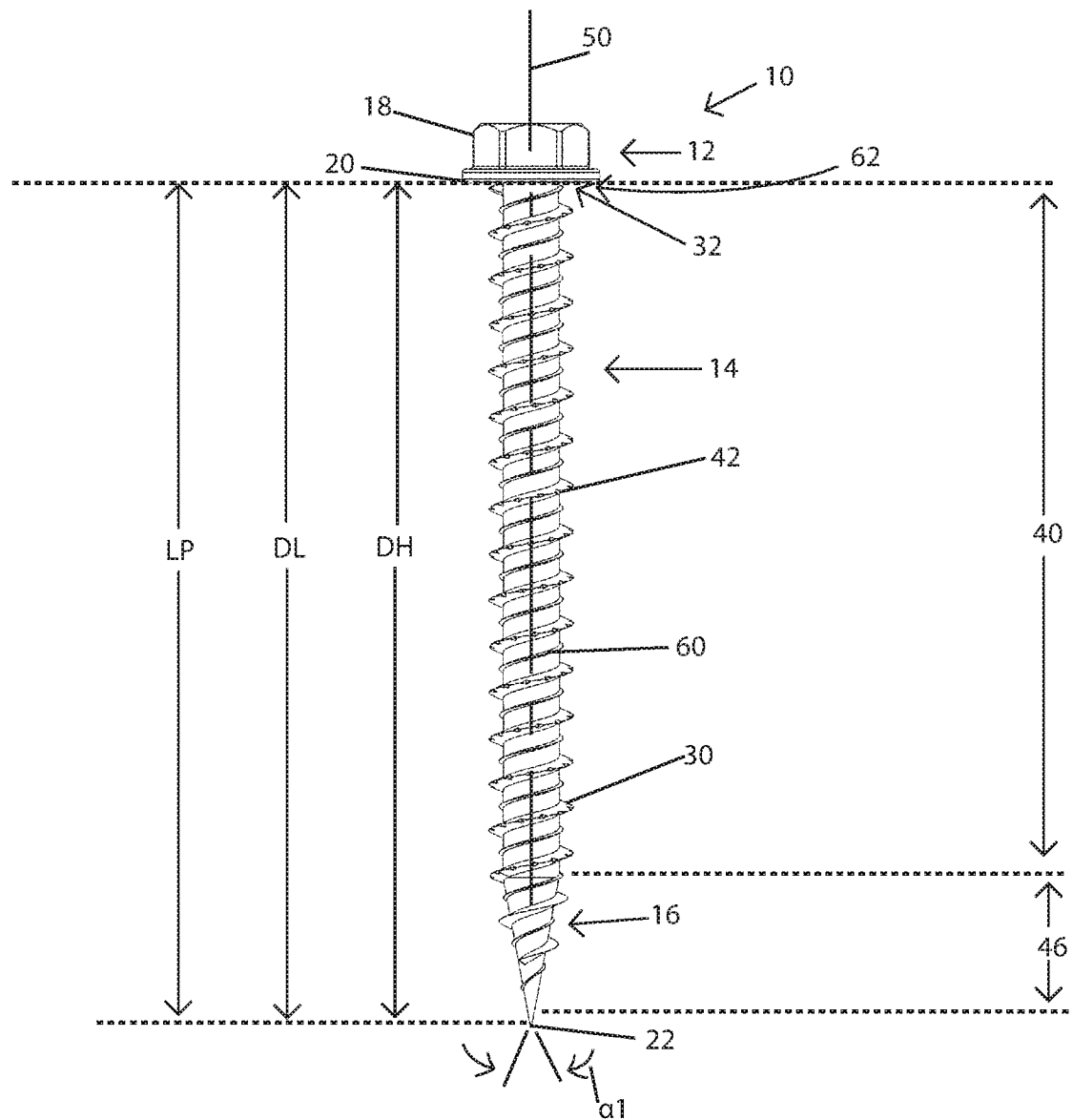
FIG. 1 shows a side elevation view of one embodiment of a concrete screw.
Figure 2:
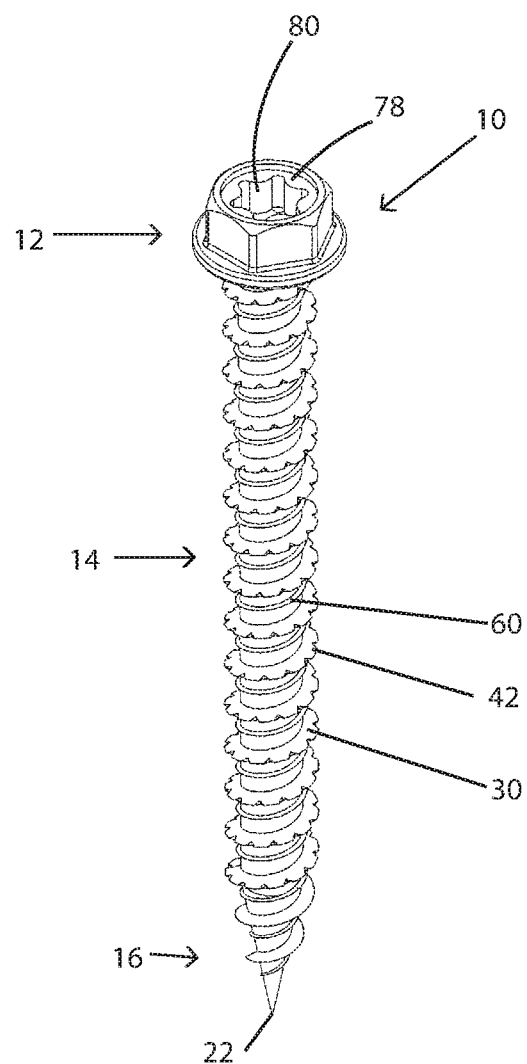
FIG. 2 shows a perspective view of the screw.
Figure 3:
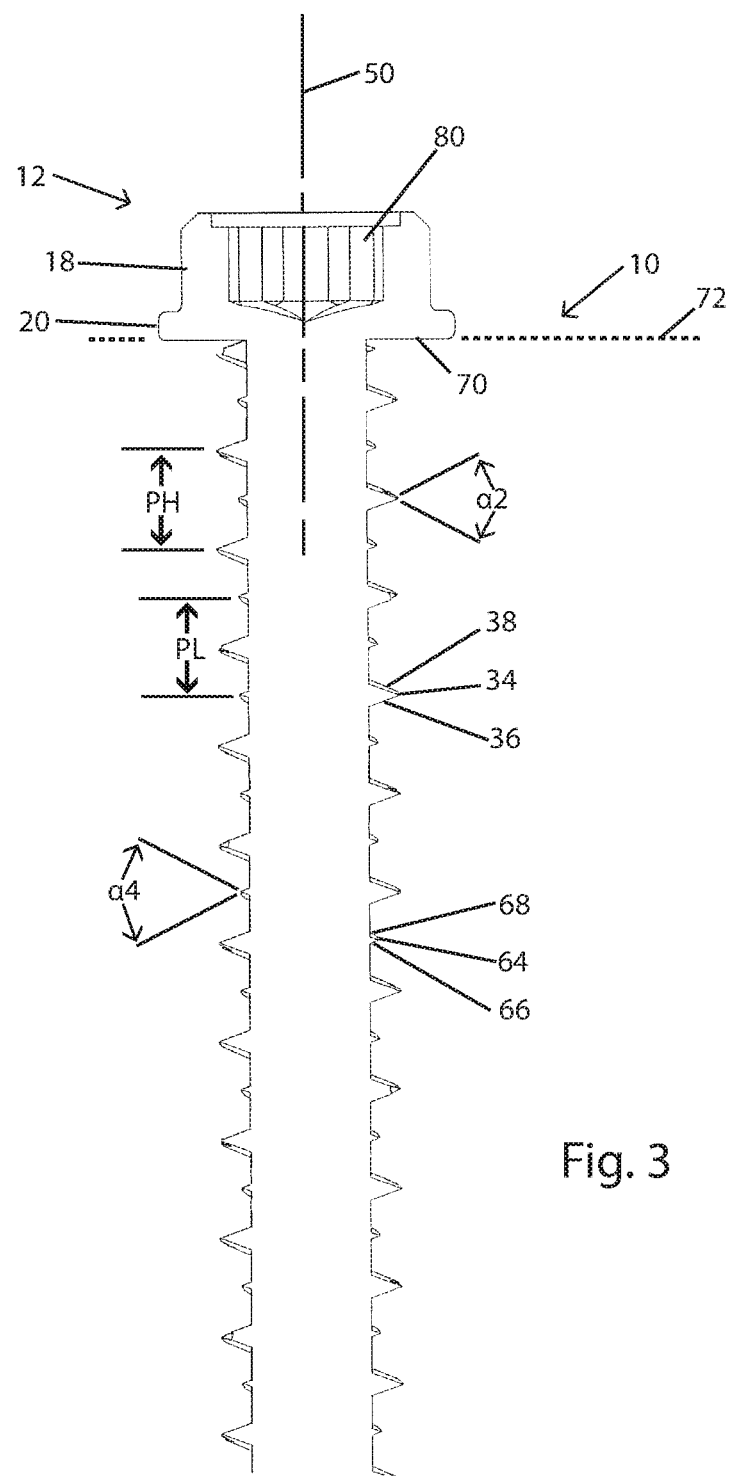
FIG. 3 shows a partial cross-section view of the screw taken along a plane in which the screw axis lies.
Figure 4:
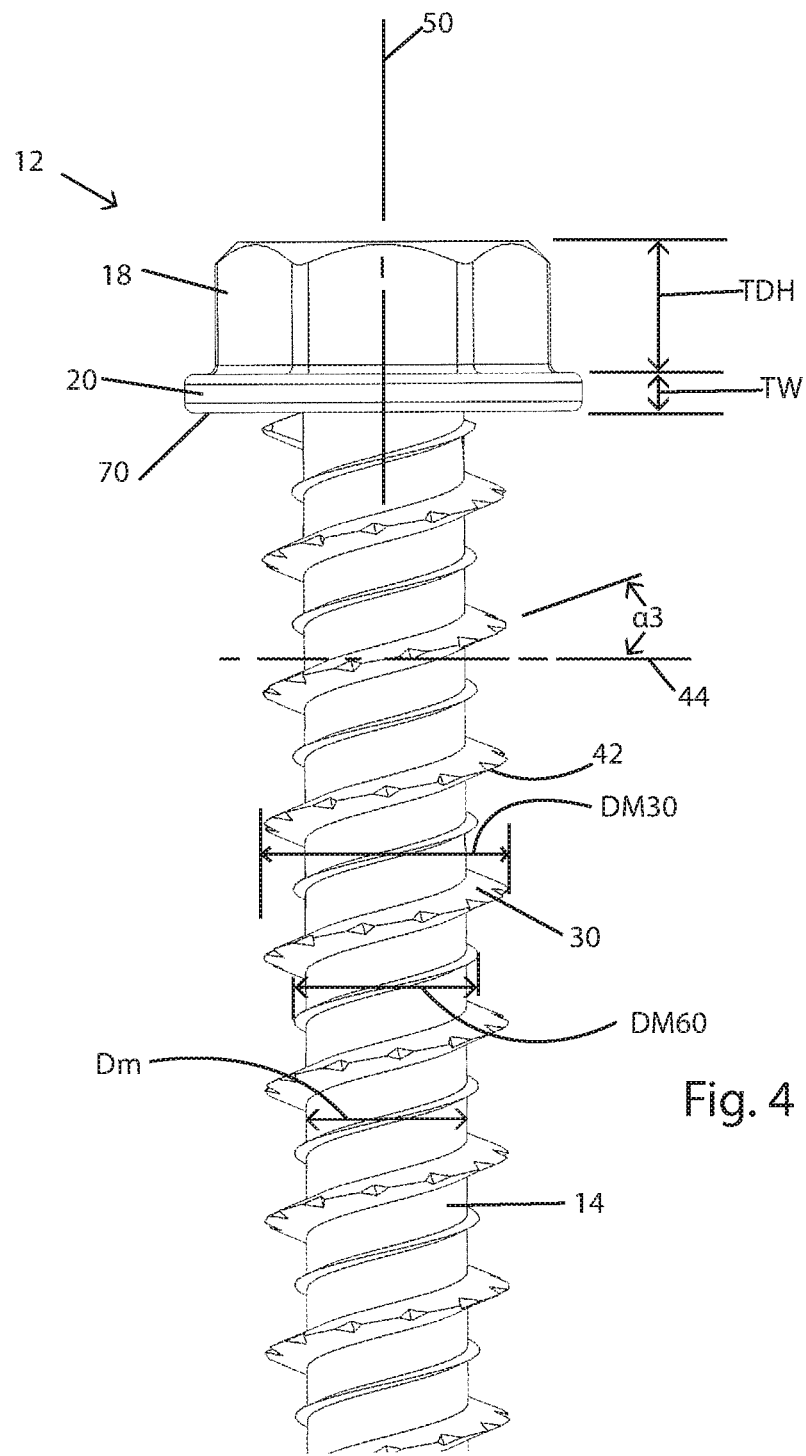
FIG. 4 shows a partial side elevation view of the screw.

The description below references a concrete screw. However, the same screw configuration advantageously provides high resistance to pullout in hurricane applications in which the screw may be placed into materials other than concrete.

Referring to FIGS. 1-5, one embodiment of a concrete screw 10 is shown. The concrete screw includes a head end 12, a shank or core 14 and a tapered end 16. The head end 12 includes a drive head part 18 and an integrated washer part 20 and is located at one end of the shank 14. As used herein the term shank refers to the elongated core or shaft of the screw, which can include threaded and unthreaded portions. The tapered end 16 is located at an opposite end of the shank 14 and terminates in a point or tip 22. By way of example, the taper angle α1 defining the point 22 may be between about twenty to thirty-five degrees (such as about twenty-two to thirty degrees).

A high thread 30 begins on the tapered end 16 (e.g., preferably at the very tip or only slightly short of the tip), extends onto the shank 14 and terminates at an axial location 32 along the shank. The high thread 30 is a right-hand thread as shown, and has a peripheral edge 34 formed where a leading flank 36 meets a trailing flank 38, which together define a high thread angle α2 of between about thirty degrees and about forty-five degrees (e.g. between 35° and 45°). In one implementation, the high thread is symmetric, with a leading flank angle and a trailing flank angle that are both the same.

A helical portion or extent 40 of the peripheral edge 34 includes a plurality of notches 42 spaced apart from each other in an equidistant manner. Here, the helical portion 40 begins on or proximate to the tapered end 16 and extends along the remainder of the high thread toward to the axial location 32. By way of example, each helical turn of the high thread (i.e., each helical portion of the high thread that extends through three-hundred and sixty degrees about the elongated axis 50 of the screw) may include 11 notches 42, but other variations are possible, including less than 11 notches or more than 11 notches. In one example, the notches may be formed as substantially V-shaped notches that are oriented substantially perpendicular to the thread helix angle α3 of the thread 30, which angle α3 may be between about ten degrees and about twenty-five degrees, where the helix angle is the cut angle of the thread relative to a plane 44 perpendicular to the central axis 50 of the thread. In the context of the present application the term "V-shaped" as used in relation to thread peripheral edge notches means that the notch is formed as a V-shaped recess or cutout along the peripheral edge, which may have a sharp point at the bottom of the V-shape, a flat at the bottom of the V-shape or a curvature at the bottom of the V-shape.

In the illustrated embodiment, the high thread 30 includes another helical portion or extent 46 extending from helical portion or extent 40 toward the screw tip 22, where helical portion 46 is completely free of any notches along the peripheral edge. However, in other variations the notch arrangement could run substantially the full length of the high thread 30.

The screw 10 has a penetrating axial length LP defined between the tip 22 of the tapered end 16 and a location at which the shank 14 meets the head end 12. An axial distance DH is defined between the tip 22 of the tapered end 16 and the axial location 32. Here, the axial distance DH is at least ninety-five percent of the penetrating axial length LP of the screw. However, variations are possible (e.g., distance DH at least ninety percent of length LP).

A low thread 60 begins on the tapered end 16 (e.g., preferably at the very tip or only slightly short of the tip), extends onto the shank 14 and terminates at an axial location 62 along the shank. Here, the axial location 62 is substantially the same as the axial location 32, and an axial length of the low thread is substantially the same as and contiguous with the axial length of the high thread. The low thread 30 is a right-hand thread as shown, and has a peripheral edge 64 formed where a leading flank 66 meets a trailing flank 68, which together define a low thread angle α4 of between about thirty degrees and about forty-five degrees (e.g. between 35° and 45°). In one implementation, the low thread is symmetric, with a leading flank angle and a trailing flank angle that are both the same. Notably, peripheral edge 64 is free of any notches.

An axial distance DL is defined between the tip 22 of the tapered end 16 and the axial location 62. Here, the axial distance DL is at least ninety-five percent of the penetrating axial length LP of the screw. However, variations are possible (e.g., distance DL at least ninety percent of length LP).

The pitch PH of the high thread 30 is substantially uniform along the length of the thread, as is the pitch PL of the low thread 60, and the low thread pitch PL is substantially the same as the high thread pitch PH. Each turn of the low thread 60 is located substantially at an axial mid-point between adjacent turns of the high thread 30.

The high thread 30 includes a minor diameter Dm and a major diameter DM30, and the low thread 60 includes the same minor diameter Dm and a major diameter DM60. The height of each thread along the shank 14 is defined as the major diameter less the minor diameter. The shank 14 is substantially a right-circular cylinder, and the cross-section of the tapered end 16 is circular, where the cross-section lies in any plane that is perpendicular to the screw axis 50.

Figure 5:
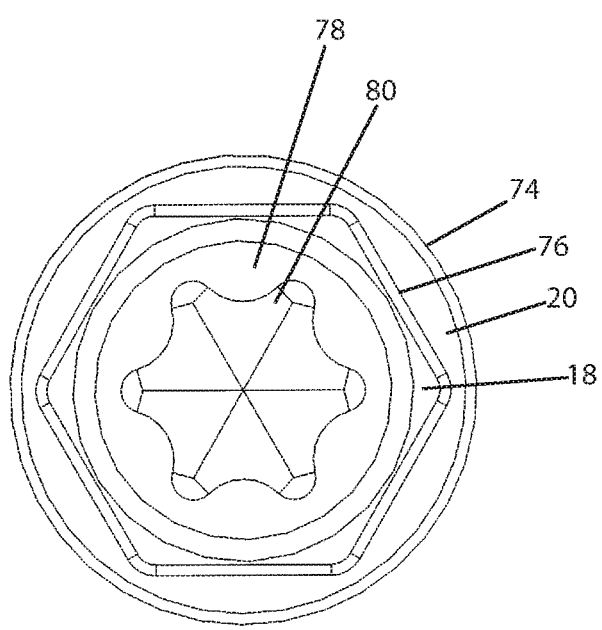
FIG. 5 shows a head end axial view of the screw.

As mentioned above, the head end 12 includes a drive head part 18 and an integrated washer part 20. The washer 20 includes a lower surface 70 facing the tapered end 16. The lower surface 70 is substantially planar, and lies within a plane 72 that is substantially perpendicular to the screw axis 50. The washer 20 includes a periphery 74 that extends outward beyond the periphery 76 of the drive head 18 in axial end view (FIG. 5). The drive head periphery 76 defines a hex-shape for socket engagement, and the washer periphery 74 defines a circular shape. An end face 78 of the drive head 18 include a drive recess 80 to receive a drive tool. Here the recess is formed with a star-drive mating configuration, but other configurations are possible. The washer 20 has an axial thickness TW and the drive head 18 has an axial thickness TDH. Here, the axial thickness TW is less than thirty percent of axial thickness TDH, but other variations are possible.

Various implementations of concrete screws in accordance with the configuration depicted in FIGS. 1-5 are possible. By way of example, Tables 1 and 2 below sets forth various examples of such screw implementations. Typical axial penetrating lengths LP for such screws may be in the range of between about one inch and about five inches.

TABLE 1

Exemplary Screw Dimensions
(All Ranges in Inches)

| Ex. | Thread Pitch (PH & PL) | Dm | DM30 | DM60 | High Thread Height | Low Thread Height |
|---|---|---|---|---|---|---|
| 1 | 0.100-0.125 | 0.120-0.140 | 0.190-0.210 | 0.145-0.165 | 0.055-0.085 | 0.010-0.035 |
| 2 | 0.120-0.140 | 0.160-0.180 | 0.240-0.260 | 0.200-0.215 | 0.070-0.090 | 0.020-0.045 |
| 3 | 0.130-0.150 | 0.215-0.245 | 0.300-0.330 | 0.265-0.285 | 0.075-0.105 | 0.035-0.065 |
| 4 | 0.120-0.130 | 0.195-0.210 | 0.270-0.290 | 0.225-0.240 | 0.070-0.090 | 0.020-0.040 |

TABLE 2

Exemplary Screw Dimensions
(All Ranges in Inches)

| Ex. | Thread Pitch (PH & PL) | Dm | DM30 | DM60 | High Thread Height | Low Thread Height |
|---|---|---|---|---|---|---|
| 1 | 0.100-0.125 | 0.126-0.133 | 0.195-0.205 | 0.150-0.155 | 0.062-0.079 | 0.017-0.029 |
| 2 | 0.125-0.135 | 0.168-0.175 | 0.248-0.253 | 0.203-0.208 | 0.073-0.085 | 0.028-0.040 |

TABLE 2-continued

Exemplary Screw Dimensions
(All Ranges in Inches)

| Ex. | Thread Pitch (PH & PL) | Dm | DM30 | DM60 | High Thread Height | Low Thread Height |
|---|---|---|---|---|---|---|
| 3 | 0.135-0.145 | 0.225-0.230 | 0.315-0.320 | 0.270-0.275 | 0.085-0.095 | 0.040-0.050 |
| 4 | 0.120-0.130 | 0.200-0.205 | 0.278-0.283 | 0.230-0.235 | 0.073-0.087 | 0.025-0.035 |

Figure 6:
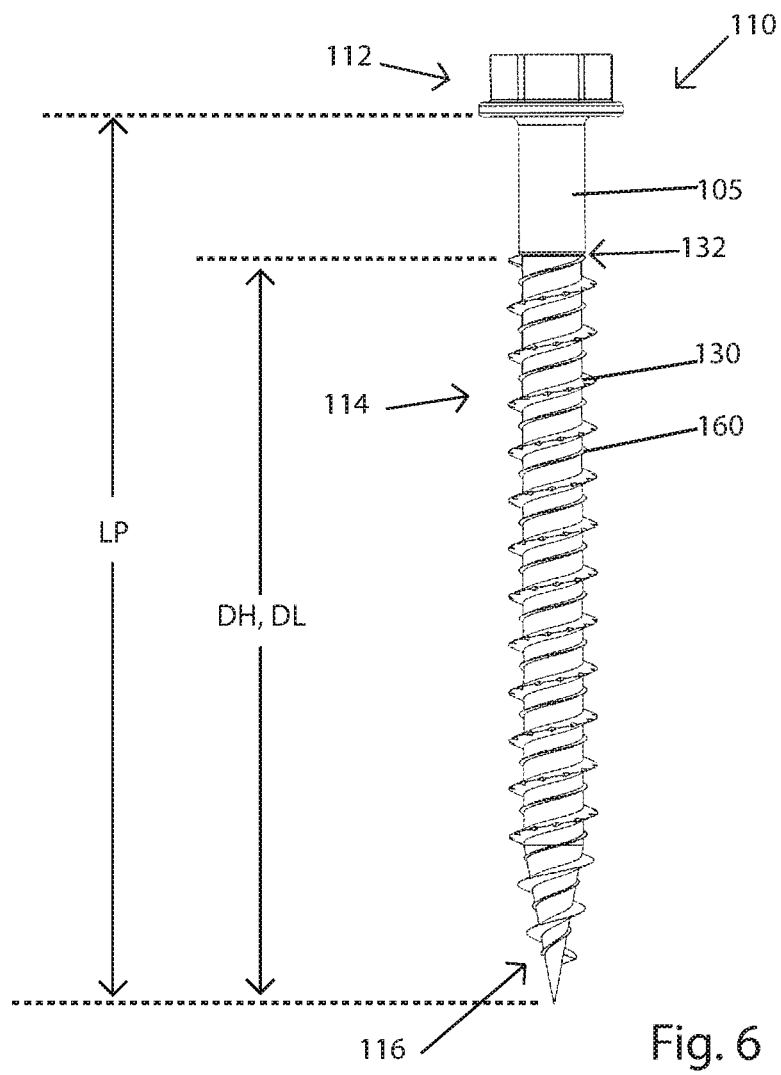
FIGS. 6-7 shows another embodiment of a concrete screw.
Figure 7:
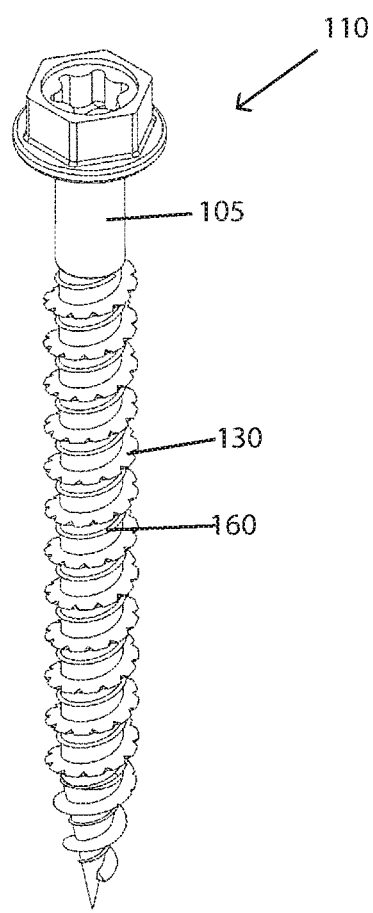

Referring now to FIGS. 6 and 7, an alternative embodiment of a concrete screw 110 is shown having head end 112, shank 114 and tapered end 116. Screw 110 is similar in configuration to screw 10 above, but screw 110 includes an unthreaded shank part 105 disposed between the axial locations 132 and 162 where the high thread 130 and low thread 160 end. Here, the distances DH and DL, which are substantially the same, may be at least seventy-five percent of penetrating length LP, but no more than ninety percent of the penetrating length LP. The outer diameter of the unthreaded shank part 105 is the same as, or only slightly smaller than, the major diameter of the low thread 160. The screw configuration with unthreaded shank part 105 may be utilized, for example, in longer length screw implementations. In some longer embodiments, the unthreaded shank portion 105 may be substantially longer relative to the overall length of the screw and the axial length of the threaded portion of the shank.

Figure 8:
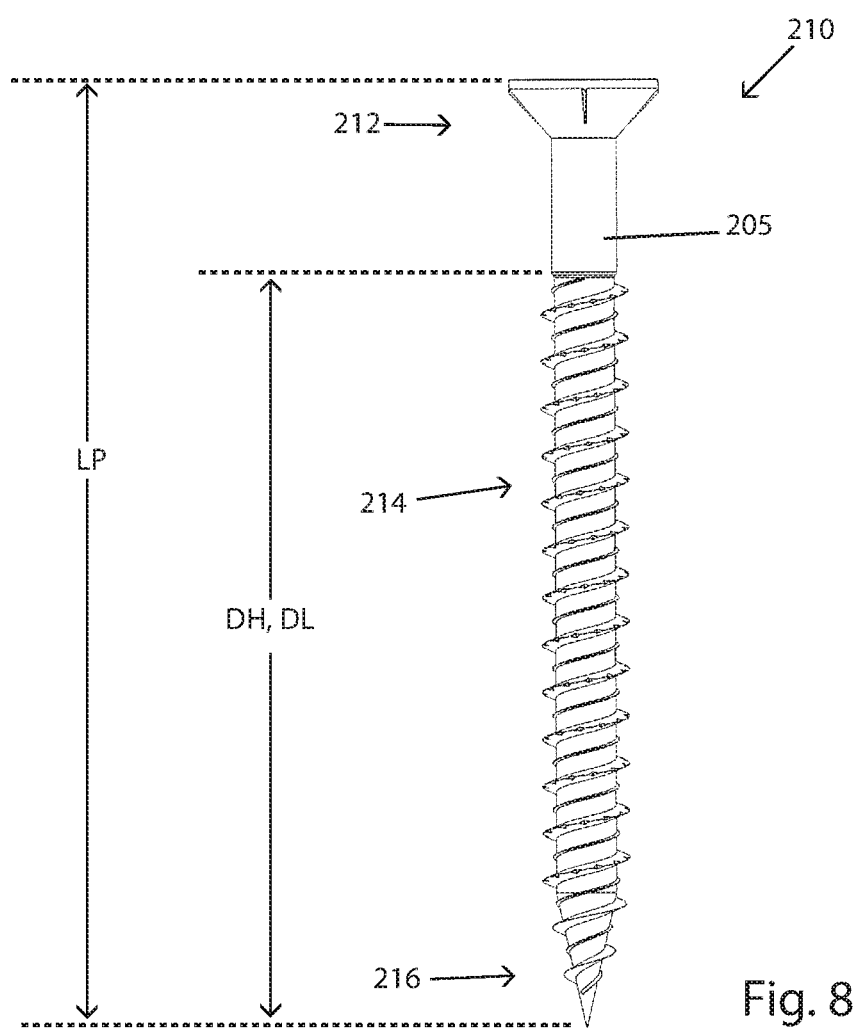
FIG. 8-10 show another embodiment of a concrete screw.
Figure 9:
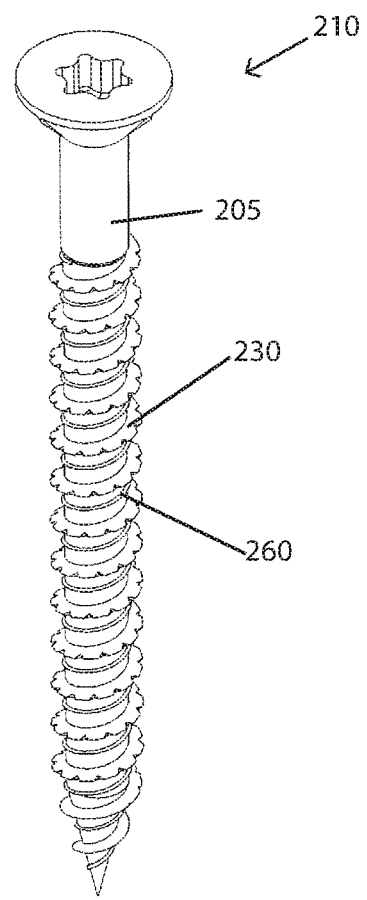
Figure 10:
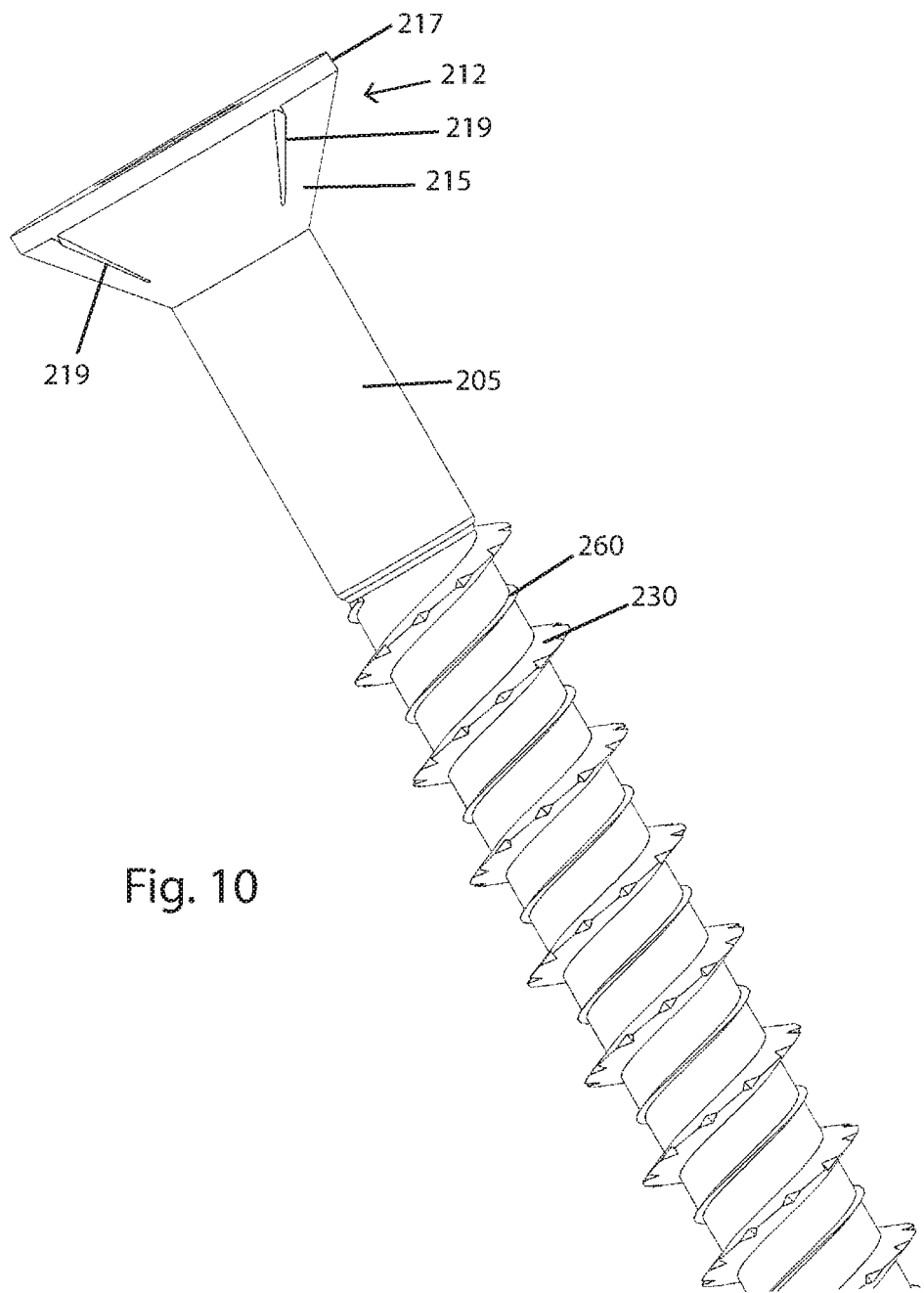

Referring now to FIGS. 8-10, an alternative configuration of a concrete screw 210 is shown having head end 212, shank 214 and tapered end 216. Screw 210 is similar in configuration to screw 110 above, but screw 210 includes a flat countersunk head configuration rather than a hex washer head configuration. The head end 212 has a frustoconical tapered portion 215 extending from the unthreaded shank part 205 and leading to a cylindrical part 217. The frustoconical surface includes a plurality of nibs 219 formed thereon, each nib extending from the cylindrical part 217 toward the shank part 205. Various nib configurations are possible. The high and low threads 230 and 260, the distances DH and DL and the penetrating length LP are also shown, it being noted that the penetrating length LP is substantially the entire screw length in the case of this countersunk head configuration of the screw 210. Embodiments of the countersunk head screw configuration that lack the unthreaded shank part 205 are also possible.

Figure 11:
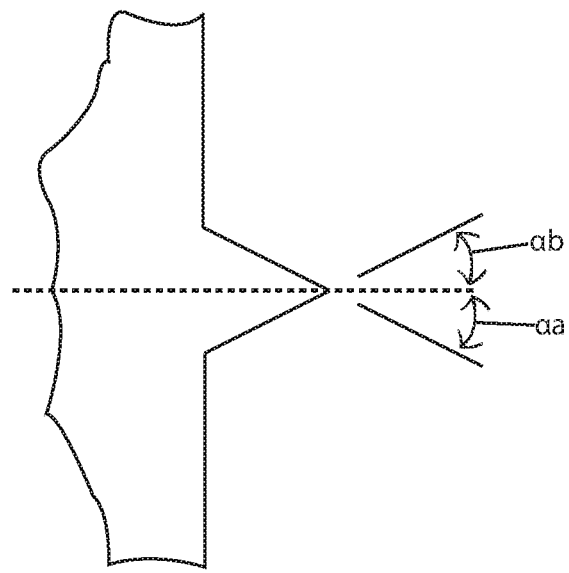
FIG. 11 shows an exemplary symmetric thread profile.
Figure 12:
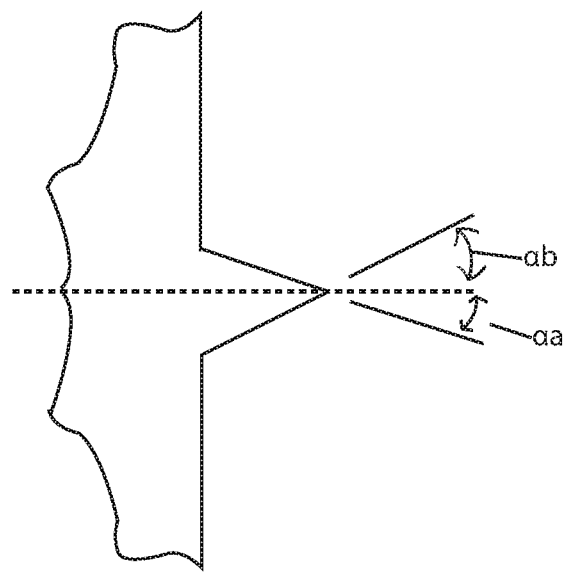
FIG. 12 shows an exemplary asymmetric thread profile.

It is to be clearly understood that the above description is intended by way of illustration and example only, is not intended to be taken by way of limitation, and that other changes and modifications are possible. For example, while certain relative dimensions have been provided by example above, variations are possible. In addition, while the primary embodiments described above reflect screws in which both the high thread and the low thread are symmetric, which, as reflected in FIG. 11 means that the leading flank angle αb is equal to the trailing flank angle αa, variations are possible. In particular, one or both of the high thread and the low thread of the above-described screws could be asymmetric, which, as reflected in FIG. 12, means that the leading flank angle αb is different than the trailing flank angle αa. In such cases, it is contemplated that the leading flank angle αb will be greater than the trailing flank angle αa as depicted in FIG. 12. For example, the leading flank angle αb could be in the range of twenty to thirty degrees and the trailing flank angle αa in the range of ten to twenty degrees. Table 3 below reflects the possible thread combinations:

TABLE 3

Exemplary Thread Combinations

| Ex. | Hi Thread | Lo Thread |
|---|---|---|
| 1 | Symmetric | Symmetric |
| 2 | Symmetric | Asymmetric |
| 3 | Asymmetric | Symmetric |
| 4 | Asymmetric | Asymmetric |

The subject concrete screw has a special geometry combination of the high thread and low thread which is a unique design configuration for use in concrete applications and construction for both high-strength concrete 6,500 to 8,500 psi (45 to 60 MPa), low-strength concrete 2,500 to 4,000 psi (17 to 28 MPa) and hollow concrete block. This new design provides higher pull-out force which is critical in the structural design for more holding power and also provides improved pull-out resistance in other materials, which is useful in hurricane prone areas.

The concrete screw has special thread profile for both low thread and high thread which reduces diving torque, requiring less effort on the part of installers. As a result of the special thread profile, the energy of the typical power drill battery will be consumed less and more screws will be drilled per charge.

Figure 13:
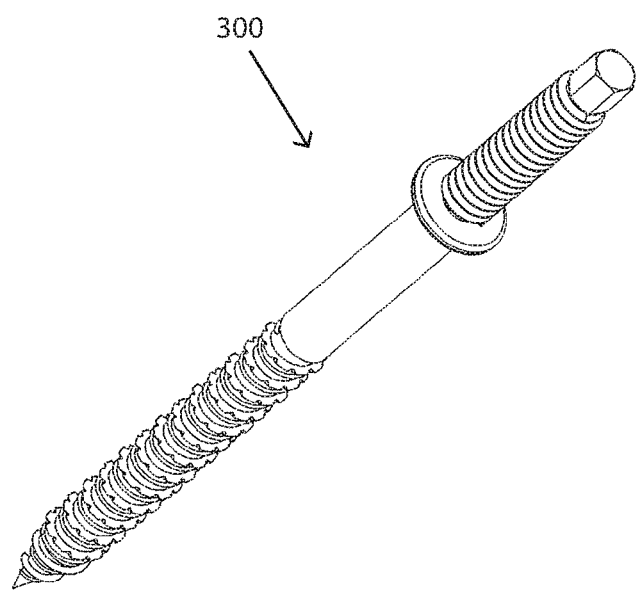
FIG. 13 shows another embodiment of a screw.
Figure 14:
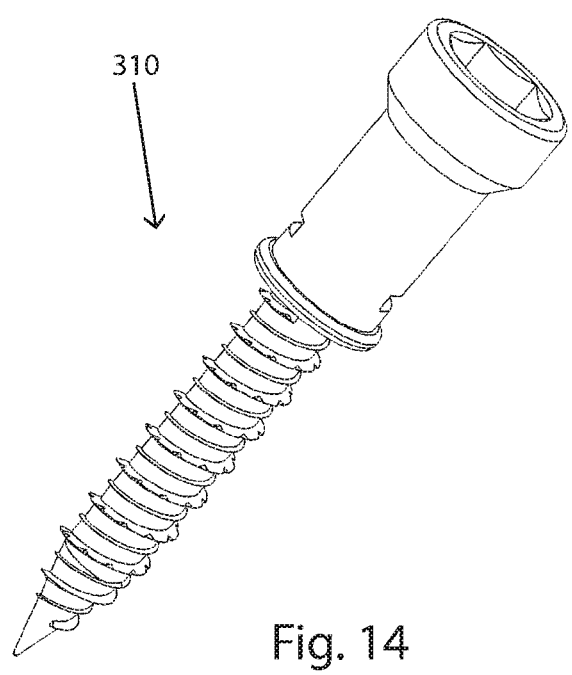
FIG. 14 shows another embodiment of a screw.
Figure 15:
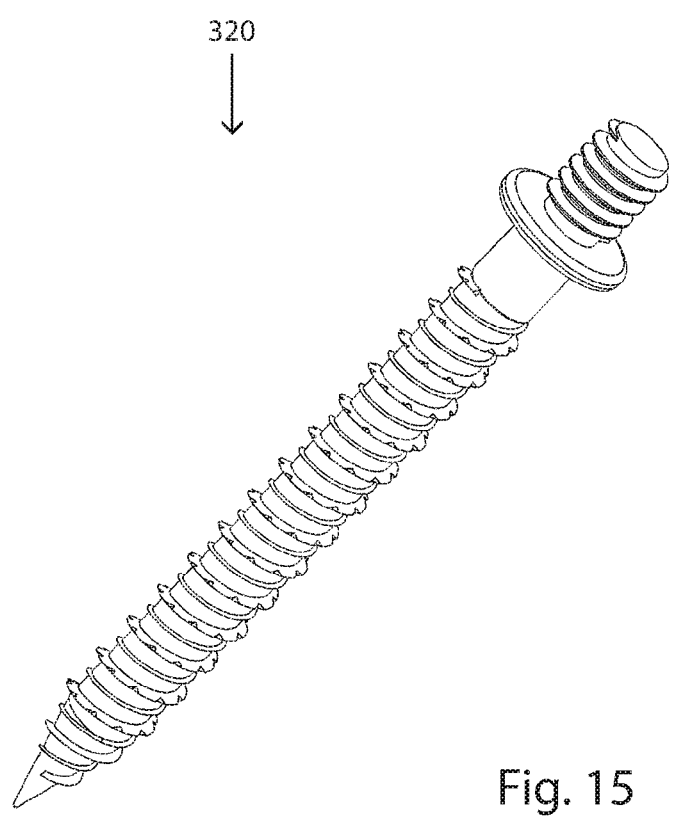
FIG. 15 shows another embodiment of a screw.
Figure 16:
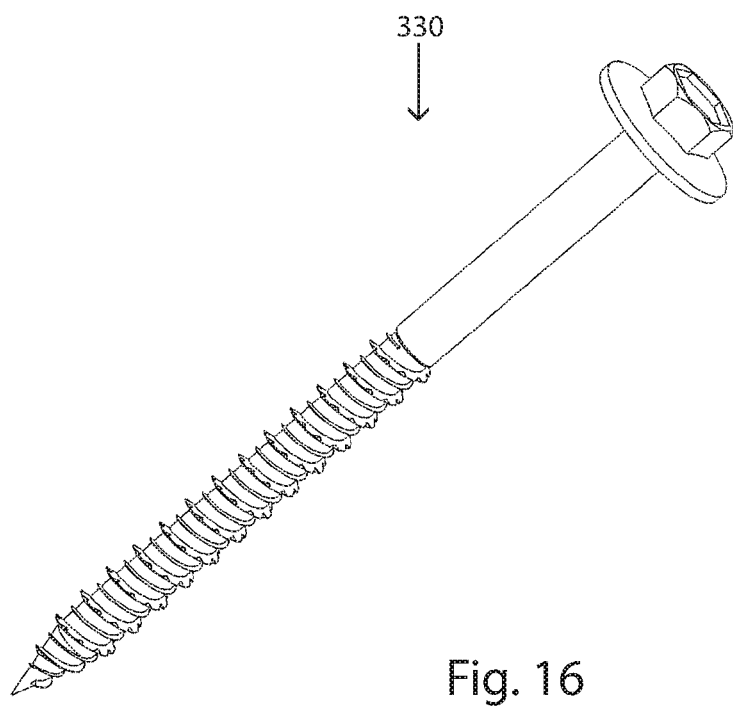
FIG. 16 shows another embodiment of a screw.
Figure 17:
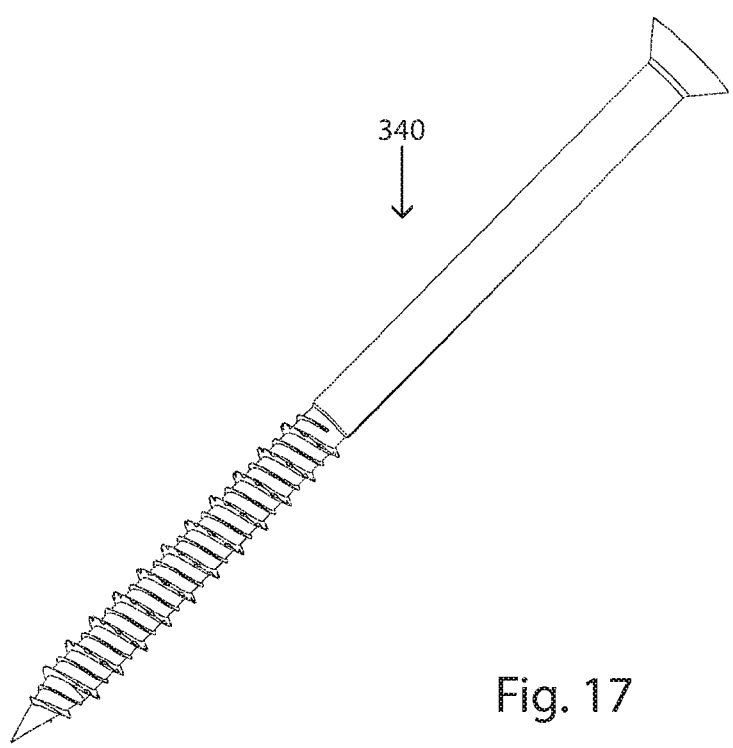
FIG. 17 shows another embodiment of a screw.
Figure 18:
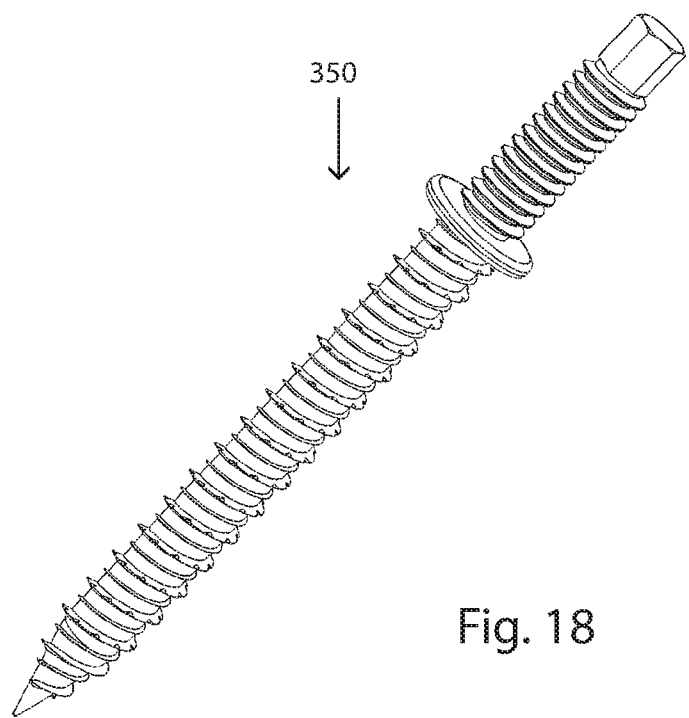
FIG. 18 shows another embodiment of a screw.

The described screw thread form (consistent with the aspects described above in the summary and consistent with one or more of the screw dimension sets described in Tables 1 and 2 above) can be incorporated into other screws having a variety of head configurations). For example, FIG. 13 shows such a screw 300 in the form of a male hurricane screw with high and low threads that extend partially along the shank, a hex head end and a mating thread at the head end. FIG. 14. shows a female hurricane screw 310 with high and low threads that extend fully along the shank to the flange/washer, and a female hex end. FIG. 15 shows a female hurricane screw 320 with high and low threads that extend partially along the shank to a location short of the flange/washer, and head end with a mating thread. FIG. 16 shows another variation of a screw 330 with a hex end. FIG. 17 shows another variation of a screw 340 with a flat countersinking head. FIG. 18 shows another male hurricane screw 350 with high and low threads that extend along the shank all the way to the flange/washer, a hex head end and a mating thread at the head end.

What is claimed is:

1. A screw for use in concrete applications and hurricane applications, comprising:
a head end, a shank and a tapered end, the head end including a tool engaging part, the head end located at one end of the shank and the tapered end located at an opposite end of the shank, wherein the tapered end includes a tapered portion with a taper angle that defines a point of the screw;

a high thread formed along the shank, wherein the high thread begins on the tapered portion, extends onto the shank and terminates at a first axial location along the shank, wherein the high thread defines a high peripheral edge, and at least a first helical portion of the high peripheral edge includes a plurality of notches, wherein the first helical portion extends from on or proximate to the tapered end and substantially to the first axial location, wherein the high thread includes a leading flank and a trailing flank that meet at the high peripheral edge and together define a high thread angle that is between about thirty degrees and about forty-five degrees;

a low thread formed along the shank, wherein the low thread begins on the tapered portion, extends onto the shank and terminates substantially at the first axial location along the shank such that an axial length of the low thread is substantially the same as and contiguous with an axial length of the high thread, wherein the low thread defines a low peripheral edge that is free of any notches, wherein the low thread includes a leading flank and a trailing flank that meet at the low peripheral edge and together define a low thread angle that is between about thirty degrees and about forty-five degrees;

wherein the high thread and low thread include a minor diameter Dm, the high thread includes a major diameter DM30, the low thread includes a minor diameter DM60, wherein the concrete screw satisfies at least one of the following four sets of criteria:

| Dm = | DM30 = | DM60 = |
|---|---|---|
| 0.120-0.140" | 0.190-0.210" | 0.145-0.165" | or

| Dm = | DM30 = | DM60 = |
|---|---|---|
| 0.160-0.180" | 0.240-0.260" | 0.200-0.215" | or

| Dm = | DM30 = | DM60 = |
|---|---|---|
| 0.215-0.245" | 0.300-0.330" | 0.265-0.285" | or

| Dm = | DM30 = | DM60 = |
|---|---|---|
| 0.195-0.210" | 0.270-0.290" | 0.225-0.240". |

2. The screw of claim 1 wherein:
the concrete screw has a penetrating axial length, and
a first axial distance between the tip of the tapered end and the first axial location is at least seventy-five percent of the penetrating axial length.

3. The screw of claim 2 wherein the first axial distance is at least ninety percent of the penetrating axial length.

4. The screw of claim 1 wherein a second helical portion of the high peripheral edge lacks any notches, wherein the first helical portion is closer to the head end than the second helical portion.

5. The screw of claim 4 wherein the second helical portion is located entirely on the tapered end.

6. The screw of claim 1 wherein the high thread is a symmetric thread and the low thread is a symmetric thread.

7. The screw of claim 1 wherein at least one of the high thread or the low thread is an asymmetric thread.

8. The screw of claim 1 wherein both the high thread and the low thread include a common and substantially uniform thread pitch that is between about 0.100 inches and about 0.145 inches.

9. The screw of claim 8 wherein each turn of the low thread is located substantially at a mid-point between adjacent turns of the high thread.

10. The screw of claim 1 wherein the head end includes a washer integrated with a drive head, wherein the washer includes a lower surface facing the tapered end, wherein the lower surface is defined in a plane that is substantially perpendicular to an elongated axis of the screw.

11. The screw of claim 10 wherein the washer includes a periphery that extends outward beyond a periphery of the drive head in axial end view, wherein the periphery of the drive head defines socket shape, wherein the periphery of the washer defines a circular shape.

12. The screw of claim 1 wherein the head end includes an end face with a drive recess formed therein.

13. The screw of claim 12 wherein the head end is formed as a countersunk head configuration with a frustoconical lower part having a plurality of nibs.

14. The screw of claim 1 wherein the first axial location is where the head end meets the shank.

15. The screw of claim 1 wherein the first axial location is spaced from the head end and the shank includes an unthreaded axial portion between the head end and the first axial location.

16. The screw of claim 15 wherein the unthreaded axial portion of the shank has an outer diameter that is no more than five percent different than a major diameter of the low thread.

17. A screw for use in concrete applications and hurricane applications, comprising:
a head end, a shank and a tapered end, the head end including a tool engaging part, the head end located at one end of the shank and the tapered end located at an opposite end of the shank;
a high thread formed along the shank, wherein the high thread begins on the tapered end, extends onto the shank and terminates at a first axial location along the shank, wherein the high thread defines a high peripheral edge, and at least a first helical portion of the high peripheral edge includes a plurality of notches, wherein the first helical portion extends from on or proximate to the tapered end and substantially to the first axial location, wherein the high thread includes a leading flank and a trailing flank that meet at the high peripheral edge and together define a high thread angle that is between about thirty degrees and about forty-five degrees; a low thread formed along the shank, wherein the low thread begins on the tapered end, extends onto the shank and terminates substantially at the first axial location along the shank such that an axial length of the low thread is substantially the same as and contiguous with an axial length of the high thread, wherein the low thread defines a low peripheral edge that is free of any notches, wherein the low thread includes a leading flank and a trailing flank that meet at the low peripheral edge and together define a low thread angle that is between about thirty degrees and about forty-five degrees;

wherein the high thread and low thread include a minor diameter Dm, the high thread includes a major diameter DM30, the low thread includes a minor diameter DM60, the high thread includes a thread pitch PH, the low thread includes a thread pitch PL, the high thread includes a high thread height HTH on the shank, the low thread includes a low thread height LTH along the shank, wherein the concrete screw satisfies at least one of the following four sets of criteria:

| PH & PL = | Dm = | DM30 = | DM60 = | HTH = | LTH = |
|---|---|---|---|---|---|
| 0.100-0.125" | 0.120-0.140" | 0.190-0.210" | 0.145-0.165" | 0.055-0.085" | 0.010-0.035" | or

| PH & PL = | Dm = | DM30 = | DM60 = | HTH = | LTH = |
|---|---|---|---|---|---|
| 0.120-0.140" | 0.160-0.180" | 0.240-0.260" | 0.200-0.215" | 0.070-0.090" | 0.020-0.045" | or

| PH & PL = | Dm = | DM30 = | DM60 = | HTH = | LTH = |
|---|---|---|---|---|---|
| 0.130-0.150" | 0.215-0.245" | 0.300-0.330" | 0.265-0.285" | 0.075-0.105" | 0.035-0.065" | or

| PH & PL = | Dm = | DM30 = | DM60 = | HTH = | LTH = |
|---|---|---|---|---|---|
| 0.120-0.130" | 0.195-0.210" | 0.270-0.290" | 0.225-0.240" | 0.070-0.090" | 0.020-0.040" | and
wherein the shank is formed substantially as a right-circular cylinder and the tapered end includes a circular cross-sectional shape for cross-sections taken in planes that are substantially perpendicular to an elongated axis of the screw.

18. A screw for use in concrete applications and hurricane applications, comprising:
a head end, a shank and a tapered end, the head end including a tool engaging part, the head end located at one end of the shank and the tapered end located at an opposite end of the shank;
a high thread formed along the shank, wherein the high thread begins on the tapered end, extends onto the shank and terminates at a first axial location along the shank, wherein the high thread defines a high peripheral edge, and at least a first helical portion of the high peripheral edge includes a plurality of notches, wherein the first helical portion extends from on or proximate to the tapered end and substantially to the first axial location, wherein the high thread includes a leading flank and a trailing flank that meet at the high peripheral edge and together define a high thread angle that is between about thirty degrees and about forty-five degrees; a low thread formed along the shank, wherein the low thread begins on the tapered end, extends onto the shank and terminates substantially at the first axial location along the shank such that an axial length of the low thread is substantially the same as and contiguous with an axial length of the high thread, wherein the low thread defines a low peripheral edge that is free of any notches, wherein the low thread includes a leading flank and a trailing flank that meet at the low peripheral edge and together define a low thread angle that is between about thirty degrees and about forty-five degrees;

wherein the high thread and low thread include a minor diameter Dm, the high thread includes a major diameter DM30, the low thread includes a minor diameter DM60, the high thread includes a thread pitch PH, the low thread includes a thread pitch PL, the high thread includes a high thread height HTH on the shank, the low thread includes a low thread height LTH along the shank, wherein the concrete screw satisfies at least one of the following four sets of criteria:

| PH & PL = | Dm = | DM30 = | DM60 = | HTH = | LTH = |
|---|---|---|---|---|---|
| 0.100-0.125" | 0.126-0.133" | 0.195-0.205" | 0.150-0.155" | 0.062-0.079" | 0.017-0.029" | or

| PH & PL = | Dm = | DM30 = | DM60 = | HTH = | LTH = |
|---|---|---|---|---|---|
| 0.125-0.135" | 0.168-0.175" | 0.248-0.253" | 0.203-0.208" | 0.073-0.085" | 0.028-0.040" | or

| PH & PL = | Dm = | DM30 = | DM60 = | HTH = | LTH = |
|---|---|---|---|---|---|
| 0.135-0.145" | 0.225-0.230" | 0.315-0.320" | 0.270-0.275" | 0.085-0.095" | 0.040-0.050" | or

| PH & PL = | Dm = | DM30 = | DM60 = | HTH = | LTH = |
|---|---|---|---|---|---|
| 0.120-0.130" | 0.200-0.205" | 0.278-0.283" | 0.230-0.235" | 0.073-0.087" | 0.025-0.035" | and
wherein the shank is formed substantially as a right-circular cylinder and the tapered end includes a circular cross-sectional shape for cross-sections taken in planes that are substantially perpendicular to an elongated axis of the screw.

19. A screw for use in concrete applications and hurricane applications, comprising:
- a head end, a shank and a tapered end, the head end including a tool engaging part, the head end located at one end of the shank and the tapered end located at an opposite end of the shank, wherein the tapered end includes a tapered portion with a taper angle that defines a point of the screw;
- a high thread formed along the shank, wherein the high thread begins on the tapered portion, extends onto the shank and terminates at a first axial location along the shank, wherein the high thread defines a high peripheral edge, and at least a first helical portion of the high peripheral edge includes a plurality of notches, wherein the first helical portion extends from on or proximate to the tapered end and substantially to the first axial location;
- a low thread formed along the shank, wherein the low thread begins on the tapered portion, extends onto the shank and terminates substantially at the first axial location along the shank such that an axial length of the low thread is substantially the same as and contiguous with an axial length of the high thread, wherein the low thread defines a low peripheral edge that is free of any notches;
- wherein the high thread and low thread include a minor diameter Dm, the high thread includes a major diameter DM30, the low thread includes a minor diameter DM60, wherein the concrete screw satisfies at least one of the following four sets of criteria:

| Dm = | DM30 = | DM60 = |
|---|---|---|
| 0.120-0.140" | 0.190-0.210" | 0.145-0.165" | or

| Dm = | DM30 = | DM60 = |
|---|---|---|
| 0.160-0.180" | 0.240-0.260" | 0.200-0.215" | or

| Dm = | DM30 = | DM60 = |
|---|---|---|
| 0.215-0.245" | 0.300-0.330" | 0.265-0.285" | or

| Dm = | DM30 = | DM60 = |
|---|---|---|
| 0.195-0.210" | 0.270-0.290" | 0.225-0.240" |

* * * * *

UNITED STATES PATENT AND TRADEMARK OFFICE
CERTIFICATE OF CORRECTION

PATENT NO. : 10,982,703 B2
APPLICATION NO. : 16/364236
DATED : April 20, 2021
INVENTOR(S) : Farhad Lajewardi It is certified that error appears in the above-identified patent and that said Letters Patent is hereby corrected as shown below:

In the Claims

Claim 1, Column 7, Line 28 reads:
"DM30, the low thread includes a minor diameter"

Should read:
--DM30, the low thread includes a major diameter--

Claim 17, Column 9, Line 7 reads:
"DM30, the low thread includes a minor diameter"

Should read:
--DM30, the low thread includes a major diameter--

Claim 18, Column 10, Line 18 reads:
"DM30, the low thread includes a minor diameter"

Should read:
--DM30, the low thread includes a major diameter--

Claim 19, at Column 11, Line 28 reads:
"DM30, the low thread includes a minor diameter"

Should read:
--DM30, the low thread includes a major diameter--

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*